United States Patent [19]
Kim

[11] Patent Number: 6,069,986
[45] Date of Patent: May 30, 2000

[54] CLUSTER SYSTEM USING FIBRE CHANNEL AS INTERCONNECTION NETWORK

[75] Inventor: Kab-young Kim, Seoul, Rep. of Korea

[73] Assignee: SamSung Electronics Co., Ltd., Kyungki-do, Rep. of Korea

[21] Appl. No.: 09/013,466

[22] Filed: Jan. 26, 1998

[30] Foreign Application Priority Data

Jan. 27, 1997 [KR] Rep. of Korea .......................... 97-2280

[51] Int. Cl.⁷ .................................................. G02B 6/28
[52] U.S. Cl. .................................................. 385/24
[58] Field of Search ...................... 395/280, 284; 385/24

[56] References Cited

U.S. PATENT DOCUMENTS

| | | | |
|---|---|---|---|
| 4,738,476 | 4/1988 | Fiduccia ............................... | 285/148.27 |
| 5,197,130 | 3/1993 | Chen et al. .................................. | 712/3 |
| 5,218,676 | 6/1993 | Ben-Ayed et al. ....................... | 769/240 |
| 5,228,138 | 7/1993 | Pratt et al. ............................... | 359/550 |
| 5,361,363 | 11/1994 | Wells et al. ............................... | 712/22 |
| 5,377,333 | 12/1994 | Nakagoshi et al. ...................... | 710/132 |
| 5,379,440 | 1/1995 | Kelly ....................................... | 712/12 |
| 5,390,336 | 2/1995 | Hillis ....................................... | 712/22 |
| 5,414,819 | 5/1995 | Redmond et al. .................. | 364/DIG. 1 |
| 5,428,803 | 6/1995 | Chen et al. ................................. | 712/6 |
| 5,465,369 | 11/1995 | Minca ...................................... | 709/213 |
| 5,471,622 | 11/1995 | Eadline .................................... | 703/3 |
| 5,471,623 | 11/1995 | Napolitano, Jr. ........................ | 709/243 |
| 5,566,342 | 10/1996 | Denneau et al. .......................... | 712/11 |
| 5,598,568 | 1/1997 | Frisch ...................................... | 712/29 |
| 5,649,106 | 7/1997 | Tsujinmichi ............................. | 709/221 |
| 5,689,646 | 11/1997 | Thorson ................................... | 709/239 |
| 5,694,499 | 12/1997 | Tillerot et al. ............................. | 385/24 |
| 5,701,482 | 12/1997 | Harrison et al. ......................... | 709/105 |
| 5,857,113 | 1/1999 | Mueggue et al. ........................ | 359/830 |

FOREIGN PATENT DOCUMENTS 3-256158 11/1991 Japan .
4-305757 10/1992 Japan .

*Primary Examiner*—Hung N. Ngo
*Attorney, Agent, or Firm*—Robert E. Bushnell, Esq.

[57] ABSTRACT

A cluster system is provided in which Fiber Channel is used as an interconnection network and the number of nodes is small. In the cluster system, which includes first through fourth nodes and an interconnection network for connecting the nodes, each node is a processor of a parallel processing system. The interconnection network includes a first transfer loop for connecting the first, second and fourth nodes in a loop pattern; a second transfer loop for connecting the second, third and first nodes in a loop pattern; a third transfer loop for connecting the third, fourth and second nodes in a loop pattern; and a fourth transfer loop for connecting the fourth, first and the third nodes in a loop pattern. According to the invention, when the number of nodes supported by the interconnection network is small, the addition of extra nodes is more restricted than in an interconnection network according to previous technology, but the interconnection network can be constructed at small expense. In addition, the bandwidth of each node is large, delay time is short and error tolerance is large in the interconnection network according to the present invention. Finally, where a shared disk is employed, a large bandwidth is provided and time required for gaining access to the shared disk is short.

15 Claims, 5 Drawing Sheets

CLUSTER SYSTEM USING FIBRE CHANNEL AS INTERCONNECTION NETWORK

CLAIM OF PRIORITY

This application makes reference to, incorporates the same herein, and claims all benefits accruing under 35 U.S.C. §119 from an application entitled CLUSTER SYSTEM USING FIBRE CHANNEL AS INTERCONNECTION NETWORK earlier filed in the Korean Industrial Property Office on Jan. 27, 1997, and there duly assigned Ser. No. 97-2280 by that Office.

BACKGROUND OF THE INVENTION

7. Technical Field

The present invention relates to a parallel processing system in which a plurality of processors is interconnected in order to improve the performance of a computer, and more particularly, to a cluster system in which the number of nodes is small and which use Fibre Channel as an interconnection network.

2. Related Art

Since conventional parallel processing programs for business purposes are executed effectively by a symmetric multiprocessor (SMP) architecture, the SMP is used as a basic node and a plurality of nodes is interconnected in most parallel processing computers for business purposes. The following two methods are used in order to improve the performance of a system in which a plurality of nodes is loosely coupled, where the basic node is an SMP or a computer having a single processor.

One of them is to increase the number of nodes in the entire system while using a processor with conventional performance as the basic nodes. The other is to use a processor with improved performance. No matter which of the two methods is used, the characteristics of an interconnection network are an important factor which influences the performance of the entire system. The method of increasing the number of nodes is more dependent on the characteristics of the interconnection network.

Meanwhile, the computer industry is continuously trying to improve the performance of the processor. In the case of using a high performance processor, a cluster system in which the number of nodes is restricted to between 2 and 8 meets the needs of general customers with regard to price and performance. Therefore, it is preferable to develop both an interconnection network for connecting a small number of nodes (2 through 8) and an interconnection network for connecting a larger number of nodes in order to allow a system provider to meet the needs of various customers.

Two conventional methods for constructing the cluster system using Fibre Channel (FC) are a fabric method and a Fibre Channel Arbitrated loop (FC-AL) method. Hereinafter, it is assumed that an SMP is used for a basic node.

Where the number of nodes actually used in a parallel processing computer is less than the number of nodes provided by the interconnection network, the number of nodes can increase. However, this is ineffective with respect to the cost of the interconnection network. Namely, in the case of constructing the cluster system by the fabric method using a Fibre Channel switch, it is possible to easily increase the number of nodes as required, and to obtain a high throughput. However, when a switch required for constructing the fabric is expensive and the number of ports actually used is less than the number of ports provided by the switch, the ratio of the performance to the price of a system becomes worse.

The cluster system constructed by the FC-AL method has a disadvantage in that messages are delayed when nodes connected to the same loop simultaneously transfer a message since only one message can be transferred at a time.

The following patents are considered to be representative of the prior art and are burdened by the disadvantages discussed herein: U.S. Pat. No. 5,701,482 for a Modular Array Processor Architecture having A Plurality Of Interconnected load-Balanced Parallel Processing Nodes to Harrison et al., U.S. Pat. No. 5,689,646 for a Configuring Of Networked System To Permit Replacement Of Failed Modes And Selection Of Alternate Paths to Thourson, U.S. Pat. No. 5,649,106 for a Parallel Computer With Reconstruction Of Processor Clusters to Tsujimichi et al., U.S. Pat. No. 5,598,568 for a Multicomputer Memory Access Architecture to Frisch, U.S. Pat. No. 5,566,342 for a Scalable Switching Wiring Technique For Large Arrays Of Processor to Denneau et al., U.S. Pat. No. 5,471,623 for a Lambda Network Having $2^{M-1}$ Nodes In Each Of M Stages With Each Node Coupled To Four Other Nodes For Bidirectional Routing Of Data Packets Between Nodes to Napolitano, Jr., U.S. Pat. No. 5,471,622 for a Run-Time System Having Nodes For Identifying Parallel Tasks In A logic Program And Searching For Available Nodes To Execute The Parallel Tasks to Eadline, U.S. Pat. No. 5,465,369 for a Network Structure For Parallel Software Processing to Minca, U.S. Pat. No. 5,428,803 for a Method And Apparatus For A Unified Parallel Processing Architecture to Chen et al., U.S. Pat. No. 5,414,819 for an Optical Interconnection Network to Redmond et al., U.S. Pat. No. 5,390,336 for a C' Parallel Computer System Having Processing Nodes With Distributed memory With Memory Addresses Defining Unitary System Address Space to Hillis, U.S. Pat. No. 5,379,440 for a Parallel Processor With Arrays Of Clustered Processing Elements Having Inputs Separate From Outputs And Outputs Limited To A maximum Of Two Per Dimension to Kelly et al., U.S. Pat. No. 5,377,333 for a Parallel Processor System Having Computing Clusters And Auxiliary Clusters Connected With Network Of Parallel Networks And Exchangers to Nakagoshi et al., U.S. Pat. No. 5,361,363 for an Input/Output System For Parallel Computer For Performing Parallel File Transfers Between Selected number of Input/Output Devices And Another Selected Number Of Processing Nodes to Wells et al., U.S. Pat. No. 5,228,138 for a Synchronization Of Hardware Oscillators In A Mesh-Connected Parallel Processor to Pratt et al., U.S. Pat. No. 5,218,676 for a Dynamic Routing System For A Multinode Communications Network to Ben-Ayed et al., U.S. Pat. No. 5,197,130 for a Cluster Architecture For A Highly Parallel Scalar/Vector Multiprocessor System to Chen et al., and U.S. Pat. No. 4,739,476 for a Local Interconnection Scheme For Parallel Processing Architectures to Fiduccia.

SUMMARY OF THE INVENTION

It is an object of the present invention to provide a cluster system using Fibre Channel as an interconnection network, in which nodes can be added with small expense up to a limited number, and in which the number of nodes is small, the bandwidth of each node is large, delay time is short, and fault tolerance is large.

To achieve the above object, there is provided a cluster system comprising a first node, a second node, a third node, and a fourth node and an interconnection network for connecting the nodes, wherein each node is a processor of a parallel processing system, and wherein the interconnection network comprises a first transfer loop for connecting the first node, the second node, and the fourth node in a loop pattern, a second transfer loop for connecting the second node, the third node, and the first node in a loop pattern, a third transfer loop for connecting the third node, the fourth node, and the second node in a loop pattern, and a fourth transfer loop for connecting the fourth node, the first node, and the third node in a loop pattern.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT(S)

Hereinafter, the present invention will be described in detail with reference to the attached drawings.

Figure 1:
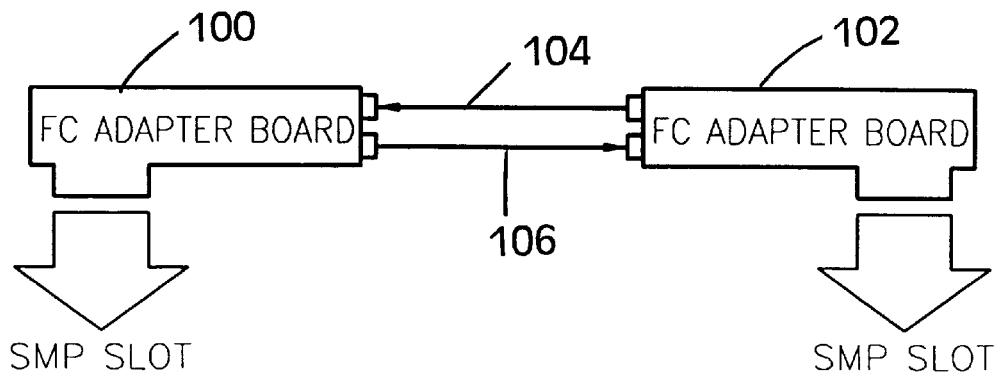
FIG. 1 shows a network structure in which two nodes are connected by an arbitrated loop (AL) method.

FIG. 1 shows the structure of an arbitrary loop (AL) network in which two nodes are connected to each other. An FC adapter board 100 for one of the two nodes is connected to an FC adapter board 102 for the other node through separate transfer and receive channels 104 and 106, respectively, thus forming a simple cluster system constructed of two SMP nodes.

Figure 2:
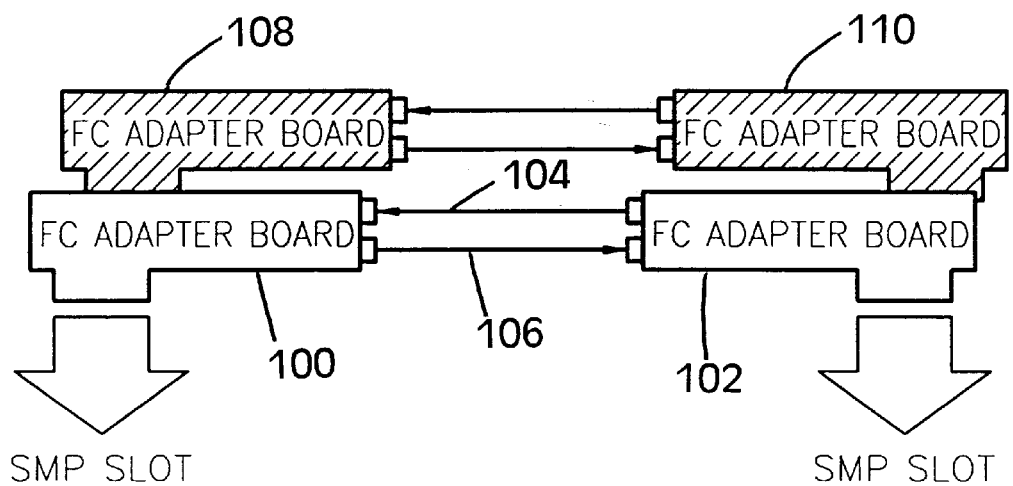
FIG. 2 shows a network structure in which throughput is increased by adding another AL to the structure of FIG. 1.

An additional AL network can be used to increase the bandwidth of a channel, as shown in FIG. 2. In this case, the bandwidth of the channel doubles and the throughput of the entire system becomes larger since each node can transfer a message. However, the number of adapters (see boards 108 and 110) doubles and two more slots are required for each SMP to connect to its FC adapter board.

Figure 3A:
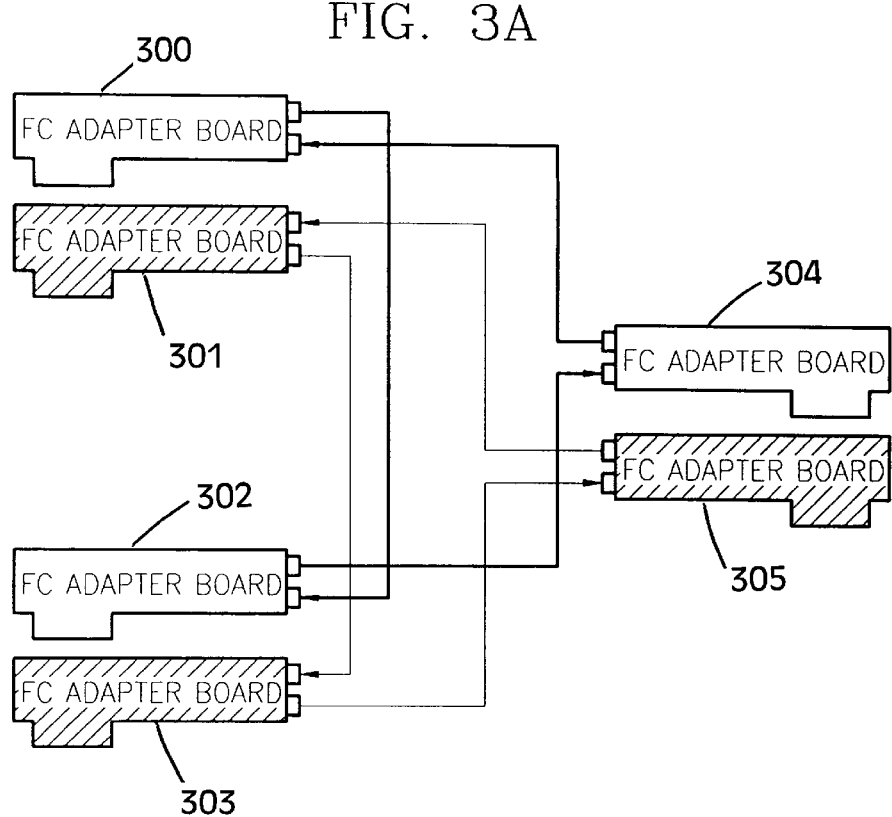
FIG. 3A shows a network structure in which three nodes are connected to each other using separate ALs.
Figure 3B:
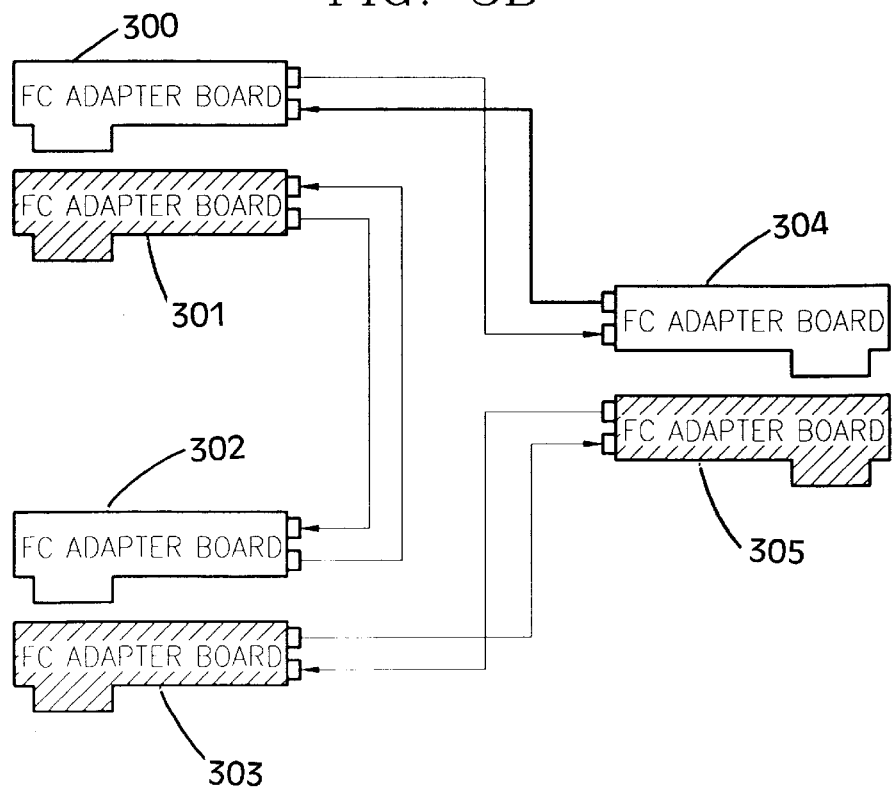
FIG. 3B shows a network structure in which three nodes are connected to each other using an exclusive path.

FIGS. 3A and 3B describe two methods for connecting three nodes. FIG. 3A shows the structure in which the bandwidth and throughput of a channel between three nodes are increased using two separate AL networks. The standard effective bandwidth of each node is increased to 0.67B (where B is the bandwidth of a channel) since the three nodes share the two networks. In this case, six adapters 300–305 are required and two peripheral component interface (PCI) slots are required for each node. In FIG. 3B, the same physical setup as is used in FIG. 3A is applied, except for the connecting method. The maximum bandwidth of each node doubles and a message delay time can be reduced. However, when a message cannot be transferred due to a fault in one network, the message can be transferred through the other network in the case of FIG. 3A. However, in the case of FIG. 3B, the message delay time becomes longer since the message must be transferred through another node. Therefore, different connection methods must be applied according to the application.

Figure 4:
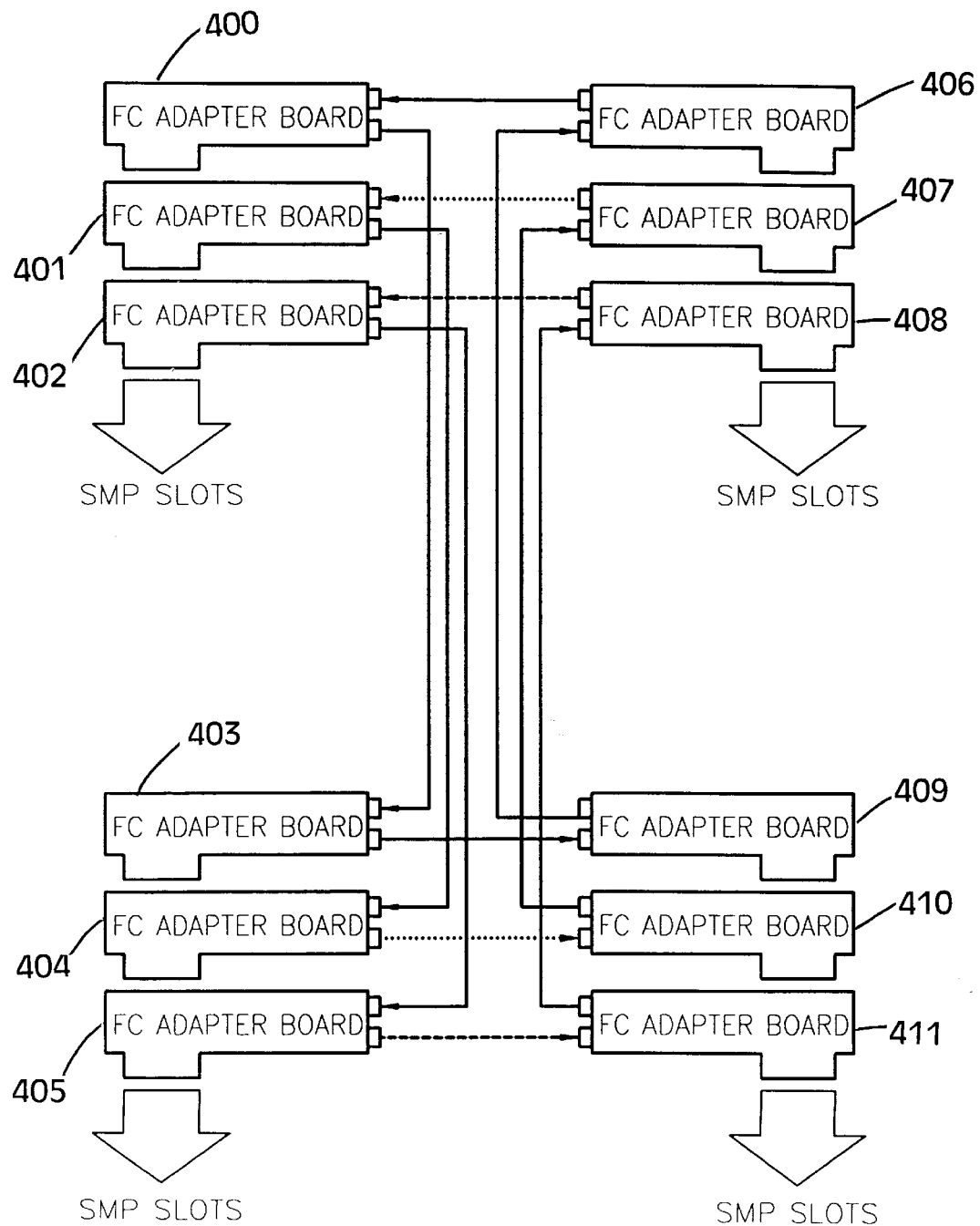
FIG. 4 shows a network structure in which throughput is increased using three separate ALs for four nodes.

FIG. 4 shows a method for connecting four nodes. In this method, three typical FC-AL networks are paralleled in order to improve the bandwidth and throughput of each node. Twelve adapter boards 400–411 are required since three adapter boards must be installed in each node in order to construct three separate AL networks. In this case, three of the four nodes can simultaneously transfer messages. The bandwidth of each node is 0.75B on the average, and the maximum bandwidth is 3B.

Figure 5:
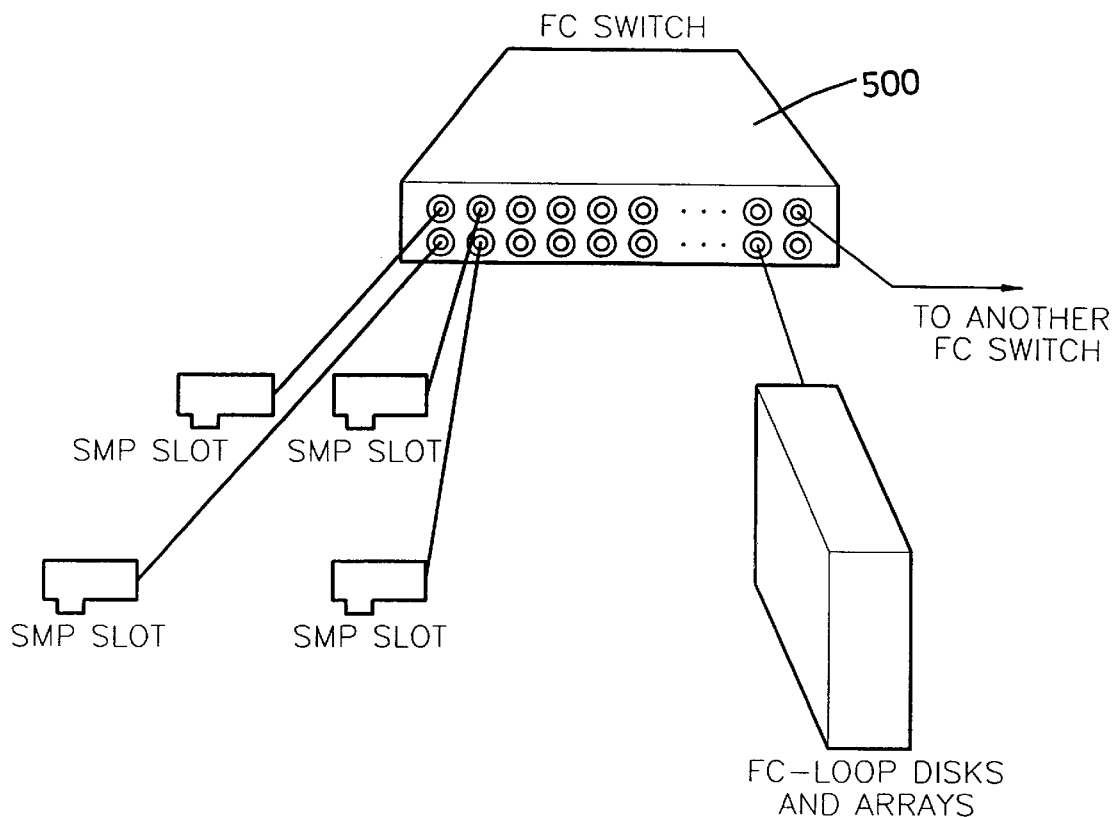
FIG. 5 shows the construction of a cluster system in which a Fibre Channel switch is used.

FIG. 5 shows a method for constructing a cluster system using a fabric. This method has an advantage in that the number of nodes can be easily increased to that of the nodes provided by a fibre channel switch 500 used as a fabric, compared with the AL networks.

Figure 6:
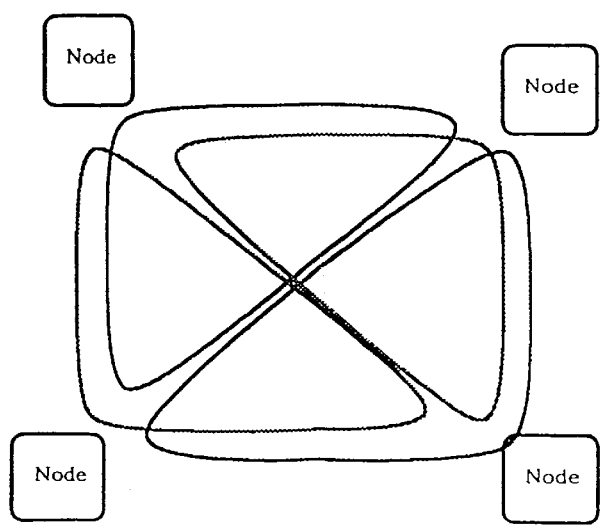
FIG. 6 shows an interconnection network in a cluster system having four nodes according to the present invention.

FIG. 6 shows an interconnection network according to the present invention in which bandwidth, delay time, and throughput are improved. The number of supported nodes is four as shown in FIG. 4, and only the method for connecting nodes is changed. Hereinafter, the connecting method is called set of arbitratated loops (SOAL) since plural arbitrated loops (ALs) are combined.

Using the SOAL method, a network can be constructed for a low price since an FC switch is not used, and fault tolerance is great since three independent loops connect to each node. Also, it is very easy to construct an interconnection network since the only hardware required for the present invention is a standard FC adapter and a standard connection cable (a fibre optic cable or a coaxial cable).

As shown in FIG. 6, four loops are used when four nodes are connected and each loop connects three nodes. Also, each loop can share a node included in another loop. Each loop is shared by three nodes (therefore, the average effective bandwidth of each node with respect to one loop is B/3). Since each node is connected to three loops, the average effective bandwidth of a node is B (as opposed to 0.75B in the case of FIG. 4). Each node has a maximum bandwidth of 3B. Since all four nodes can simultaneously transfer messages using different loops, it is never necessary for a node to wait for another node to use a channel to transfer a message. Since each loop is connected to three nodes, the time required for setting a channel (a delayed time) is shortened. If a fault occurs in one arbitrary channel, making that channel inoperative, the average effective bandwidths of the three nodes connected to the faulty channel decrease from B to 2B/3. The average effective bandwidth of the other node, which is not connected to the faulty channel remains unchanged, at B. Meanwhile, in the case of FIG. 4, the average effective bandwidth decreases from 3B/4 to B/2 when a channel develops a fault. Therefore, in the interconnection network according to the present invention, it is possible to maintain normal operation with only a small reduction in performance in the case that a channel becomes faulty.

Figure 7A:
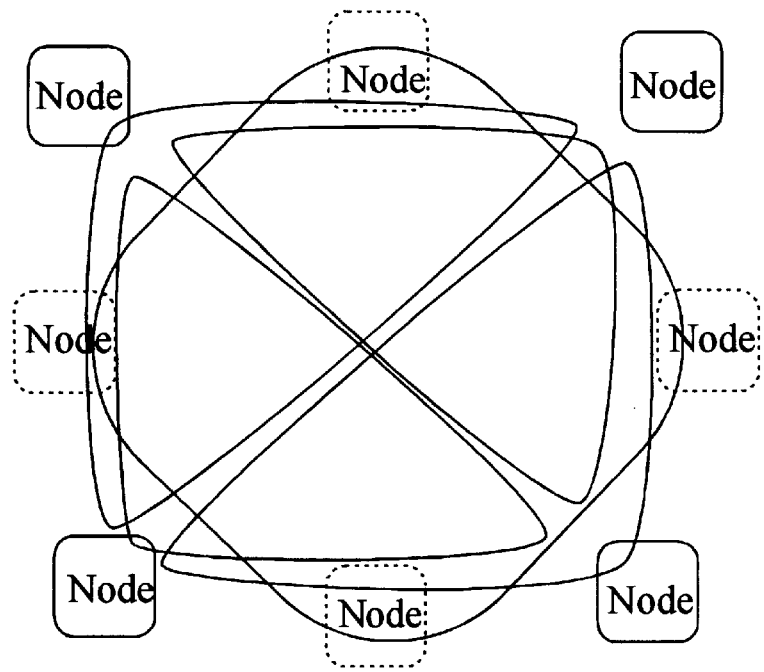
FIG. 7A shows a structure in which the number of nodes is increased to between 5 and 8 from the interconnection network shown in FIG. 6.
Figure 7B:
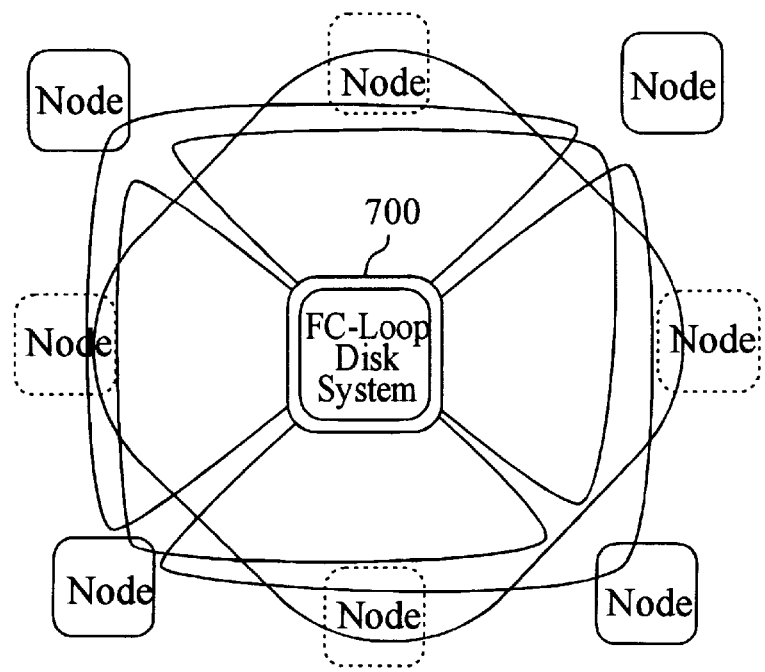
FIG. 7B shows a structure in which a disk node is connected to the interconnection network shown in FIG. 6 or FIG. 7.

FIG. 7A shows a network structure in which the number of nodes is increased to between 5 and 8 as compared to the network structure of FIG. 6. FIG. 7B shows an interconnection network in which a shared disk system is used. A fifth node which is first added can be positioned anywhere marked with a dotted line. However, nodes which are subsequently added must be continuously added in a clockwise direction or a counterclockwise direction from the fifth node. According to this method, each newly added node has only to include two adapters. A new loop is required when the number of nodes of the cluster system according to the present invention is more than 7. Then, all the nodes must include three adapters.

A shared disk 700 can be added to the system, if necessary, as shown in FIG. 7B. Waiting time is reduced since nodes in different loops are accessible to the disk in parallel by allowing four separate channels access to the disk 700. In the case that one of the four channels becomes faulty, the nodes are accessible to the disk 700 using the remaining three channels.

The number of required adapters, the number of switches, and the bandwidth of each node are as follows, when the SOAL method according to the present invention is compared with the fabric method according to previous technology.

TABLE 1

| | SOAL | | Fabric | | |
|---|---|---|---|---|---|
| Number of Nodes | Number of Adapters (with an HD array) | Node Bandwith | Number of Adapters | Number of required Switches (8 port switches) | Node Bandwith |
| 2 | 2 (3) | B | 2 | 1 | B |
| 3 | 6 (8) | 2B | 3 | 1 | B |
| 4 | 12 (16) | 3B | 4 | 1 | B |
| 5 | 14 (18) | 3B (2B for one node) | 5 | 1 | B |
| 6 | 16 (20) | 3B (2B for two nodes) | 6 | 1 | B |
| 7 | 21 (25) | 3B | 7 | 1 | B |
| 8 | 24 (28) | 3B | 8 | 2 (1 for HD) | B |

B denotes the bandwidth of an FC host adapter. The bandwidth of a node in the SOAL structure is, on average, two times larger than that of a node in the fabric structure. In the fabric structure, messages are delayed as they pass through the switch. In the SOAL structure, this delay is avoided as there is no switch. In the fabric structure, the entire cluster system may stop when a fault is generated in a switch. In the SOAL structure, network management, error detection and fault tolerance are excellent, since each node is connected to three physically separated loops.

According to the present invention, if the number of nodes supported by the interconnection network is small, the addition of extra nodes is more restricted than in the interconnection network according to conventional technology. However, the nodes in the interconnection network according to the present invention can be added at small expense. Also, the bandwidth of each node is large, the delay time is short, and the fault tolerance effect is large in the interconnection network according to the present invention. In the case of connecting to a shared disk, a large bandwidth is provided and time required for gaining access to the shared disk becomes short.

What is claimed is:

1. A cluster system comprising a first node, a second node, a third node, a fourth node and an interconnection network for connecting the nodes, wherein each node is a processor of a parallel processing system, said interconnection network comprising:

a first transfer loop for connecting the first node, the second node and the fourth node in a loop pattern;

a second transfer loop for connecting the second node, the third node and the first node in a loop pattern;

a third transfer loop for connecting the third node, the fourth node and the second node in a loop pattern; and a fourth transfer loop for connecting the fourth node, the first node and the third node in a loop pattern.

2. The cluster system as claimed in claim 1, further comprising a fifth node, and wherein transfer lines for connecting the first node to the second node define a first transfer line group, transfer lines for connecting the second node to the third node define a second transfer line group, transfer lines for connecting the third node to the fourth node define a third transfer line group, and transfer lines for connecting the fourth node to the first node define a fourth transfer line group, and wherein the fifth node is connected to all the transfer lines of one of the first, second, third and fourth transfer line groups in the interconnection network.

3. The cluster system as claimed in claim 2, further comprising a sixth node, and wherein the sixth node is connected to all of the transfer lines of one of the transfer line groups next to the transfer line group to which the fifth node is connected in the interconnection network.

4. The cluster system as claimed in claim 3, further comprising a seventh node and a fifth transfer loop for connecting the fifth node, the sixth node and the seventh node in a loop pattern, and wherein the seventh node is connected to all the transfer lines of the transfer line group next to the transfer line group to which the sixth node is connected in the interconnection network.

5. The cluster system as claimed in claim 4, further comprising an eighth node, wherein the eighth node is connected to the fifth transfer line, and the fifth, sixth, seventh and eighth nodes are connected to all the transfer lines of the first, second, third, and fourth transfer line groups, respectively, in the interconnection network.

6. The cluster system as claimed in claim 5, wherein each node comprises a predetermined number of Fibre Channel adapter boards.

7. The cluster system as claimed in claim 5, further comprising a disk node constructed of a disk system, wherein the disk node is connected to the first transfer line for connecting the second node to the fourth node, to the third transfer line for connecting the fourth node to the second node, and to the fourth transfer line for connecting the first node to the third node in the interconnection network.

8. The cluster system as claimed in claim 4, wherein each node comprises a predetermined number of Fibre Channel adapter boards.

9. The cluster system as claimed in claim 4, further comprising a disk node constructed of a disk system, wherein the disk node is connected to the first transfer line for connecting the second node to the fourth node, to the third transfer line for connecting the fourth node to the second node, and to the fourth transfer line for connecting the first node to the third node in the interconnection network.

10. The cluster system as claimed in claim 3, wherein each node comprises a predetermined number of Fibre Channel adapter boards.

11. The cluster system as claimed in claim 3, further comprising a disk node constructed of a disk system, wherein the disk node is connected to the first transfer line for connecting the second node to the fourth node, to the third transfer line for connecting the fourth node to the second node, and to the fourth transfer line for connecting the first node to the third node in the interconnection network.

12. The cluster system as claimed in claim 2, wherein each node comprises a predetermined number of Fibre Channel adapter boards.

13. The cluster system as claimed in claim 2, further comprising a disk node constructed of a disk system, wherein the disk node is connected to the first transfer line for connecting the second node to the fourth node, to the third transfer line for connecting the fourth node to the second node, and to the fourth transfer line for connecting the first node to the third node in the interconnection network.

14. The cluster system as claimed in claim 1, wherein each node comprises a predetermined number of Fibre Channel adapter boards.

15. The cluster system as claimed in claim 1, further comprising a disk node constructed of a disk system, wherein the disk node is connected to the first transfer line for connecting the second node to the fourth node, to the third transfer line for connecting the fourth node to the second node, and to the fourth transfer line for connecting the first node to the third node in the interconnection network.

* * * * *